(12) United States Patent
Weindorf et al.

(10) Patent No.: US 9,573,083 B2
(45) Date of Patent: Feb. 21, 2017

(54) FUEL FILTER

(71) Applicant: MANN+HUMMEL GMBH, Ludwigsburg (DE)

(72) Inventors: Martin Weindorf, Kornwestheim (DE); Pius Trautmann, Stuttgart (DE); Lisa Bester, Ludwigsburg (DE); Martin Veit, Gaertringen (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 39 days.

(21) Appl. No.: 14/754,071

(22) Filed: Jun. 29, 2015

(65) Prior Publication Data
US 2016/0001205 A1  Jan. 7, 2016

(30) Foreign Application Priority Data

Jul. 2, 2014 (DE) .......................... 10 2014 009 708

(51) Int. Cl.
*B01D 29/88* (2006.01)
*B01D 35/00* (2006.01)
*B01D 36/00* (2006.01)
*F02M 37/22* (2006.01)

(52) U.S. Cl.
CPC ........... *B01D 29/885* (2013.01); *B01D 35/005* (2013.01); *B01D 36/005* (2013.01); *F02M 37/221* (2013.01)

(58) Field of Classification Search
CPC ............................... F02M 37/221; F02M 39/34
See application file for complete search history.

(56) References Cited

U.S. PATENT DOCUMENTS

| 5,462,658 | A | 10/1995 | Sem |
| 7,655,140 | B2 | 2/2010 | Wieczorek et al. |
| 8,673,138 | B2 | 3/2014 | Braunheim |
| 2005/0121374 | A1 | 6/2005 | Girondi |
| 2011/0186501 | A1* | 8/2011 | Braunheim .......... B01D 29/114 210/232 |

FOREIGN PATENT DOCUMENTS

| DE | 3740804 C1 | 7/1989 |
| EP | 1653075 A2 | 5/2006 |
| EP | 2078845 A1 | 7/2009 |
| WO | 2006080875 A1 | 8/2006 |
| WO | 2010020489 A1 | 2/2010 |

* cited by examiner

Primary Examiner — Krishnan S Menon
Assistant Examiner — Ryan B Huang
(74) Attorney, Agent, or Firm — James Hasselbeck

(57) ABSTRACT

The invention relates to a fuel filter (10) having a filter element (12) for separating water from the fuel. The water can be fed into a collection chamber (24) of the fuel filter (10) via a first conduit (26), which extends from the filter element (12) to the collection chamber (24). Provided in the first conduit (26) is a branching off of a second conduit (32), which enables fluid discharge from the first conduit (26). Preferably, a throttle (34) and in particular a press-fit throttle is provided in the second conduit (32), in order to regulate the amount of outflow. The second conduit (32) preferably branches off from the first conduit (26) at substantially a 90 degree angle to the first conduit (26), so that fluid flowing in the first conduit (26) primarily flows past the second conduit (32) and reaches the collection chamber (24).

11 Claims, 2 Drawing Sheets

FUEL FILTER

TECHNICAL FIELD

The invention relates to a fuel filter for an internal combustion engine of a motor vehicle, comprising a filter element at which it is possible to separate a water-fuel mixture that can be discharged into a collection chamber of the fuel filter via a first conduit.

BACKGROUND

Patent document EP 1 653 075 A2 discloses a fuel filter device comprising a fuel filter and a fuel tank. In the fuel filter, water that accumulates in a water collection chamber of the fuel filter is separated. The water is actively drawn off from the bottom of the water collection chamber via a Venturi nozzle and pumped back into the tank.

U.S. Pat. No. 5,462,658 A discloses a water-separating fuel filter having a housing, on the underside of which a water collection chamber is constructed. A central suction tube running in a longitudinal direction of the filter is arranged in the housing in order to suction a separated water-fuel mixture out from the water collection chamber.

Patent document US 2005/0121374 A1 discloses a fuel filter device having a water-separating fuel filter. Water separated in the fuel filter is passed from the bottom of a water collection chamber of the fuel filter into a second water collection chamber via a discharge, the second water collection chamber being arranged in the fuel tank. In the second water collection chamber, further separation of the water takes place.

Patent document DE 37 40 804 C1 discloses a fuel supply device for an internal combustion engine. The fuel supply device comprises a water-separating fuel filter having a water collection chamber. If the water accumulating in the water collection chamber exceeds a predetermined level, then an alarm is triggered.

In order to be able to continue operating the fuel supply device even when the alarm is ignored, a dip tube projects into the water collection chamber and a part of the water can be returned to the tank from the water collection chamber via the dip tube.

Patent document WO 2006/080875 A1 also discloses leading water back into a tank from a water collection chamber of a fuel filter.

Patent document EP 2 078 845 A1 discloses recirculating water from a water collection chamber of a fuel filter into a fuel tank. The recirculation of the water takes place via a throttle for adjusting the recirculated water rate.

Finally, patent document WO 2010/020489 A1 discloses a fuel filter comprising a first water separator. Water that is separated at the first water separator flows into a water collection chamber of the fuel filter via a discharge. In the water collection chamber, the water is set apart from the residual fuel. At the upper side of the water collection chamber, there is an outlet through which the contents of the water collection chamber are returned to a tank.

The fuel filters known from the prior art have a disadvantage in that due to the arrangement of the outlet in the water collection chamber, predominantly the water content of the separated water-fuel mixture is returned to the tank.

SUMMARY OF THE INVENTION

The invention therefore addresses the problem of providing a fuel filter that, even after the maximum fill level of the water collection chamber has been exceeded, can reliably continue being operated through discharging of separated water-fuel mixture, and yet predominantly discharges fuel in so doing.

The problem is thus solved by a fuel filter for an internal combustion engine of a motor vehicle, comprising a filter element at which it is possible to separate a water-fuel mixture that can be discharged into a collection chamber of the fuel filter via a first conduit, wherein the fuel filter comprises a second conduit for recirculating at least a part of the water-fuel mixture into a tank of the motor vehicle, the second conduit branching off from the first conduit.

The second conduit, through which the accumulated water-fuel mixture is discharged into the tank, makes it possible to continue damage-free operation of the fuel filter even if the maximum fill level of the water-fuel mixture in the collection chamber is exceeded. Because the branching off of the second conduit is located above the collection chamber, predominantly fuel is returned to the tank when the water-fuel mixture is recirculated. In addition, the maximum fill level of the water-fuel mixture in the lower part of the fuel filter is enlarged, due to the fact that the water-fuel mixture only flows back to the tank via the second conduit if the fill level of the water-fuel mixture exceeds the height of the collection chamber.

A particularly pressure-resistant and economically producible fuel filter is achieved when the first conduit is formed integrally with the second conduit. The first conduit and the second conduit are then preferably each constructed in the form of a channel in a housing of the fuel filter.

The first conduit is preferably constructed in the form of a closed circular conduit running in the longitudinal direction of the fuel filter. In other words, the first conduit preferably is constructed in the shape of a closed loop, wherein the longitudinal axis of the first conduit extends in the longitudinal direction of the fuel filter. This allows the water-fuel mixture, having been separated at the filter element, to be discharged effectively and quickly.

The filter element is then preferably constructed so as to have axial symmetry in the longitudinal direction of the fuel filter, and comprises a sedimentation slit that is fluidly connected to the first conduit. The water-fuel mixture that is separated at the sedimentation slit flows therethrough, at very low flow resistance, into the first conduit.

The water-fuel mixture having been separated at the filter element is optimally discharged into the first conduit when the first conduit is aligned with the sedimentation slit.

A particularly high water content in the water-fuel mixture is achieved when the filter element comprises a coalescer medium that is spaced apart radially from the sedimentation slit. The water-fuel mixture that is separated at the coalescer medium can then preferably be discharged into the first conduit via the sedimentation slit. The coalescer medium is preferably disposed upstream of the sedimentation slit as seen in the flow direction. In a particularly preferred embodiment of the invention, the fuel filter comprises first a particulate filter medium, then a coalescer medium, and finally a sedimentation slit, as seen in the flow direction. This allows the fuel being passed through the filter element to be optimally cleaned.

The second conduit may branch off from the first conduit in the lower region of the first conduit facing away from the filter element. In this case, the maximum fill level of the water-fuel mixture exceeds the fill level of the collection chamber. Moreover, due to the remaining height of the first conduit from the branching off of the second conduit until the filter element, there still remains enough of a "buffer height" available for overflow water from the collection chamber to the filter element. In other words, the filter element need not be damaged even if, in a worst case scenario, the collection chamber is filled with the water-fuel mixture and more water is fed in the direction of the filter element from the tank, such that the separated water cannot flow out quickly enough via the second conduit. In such a case, there is still plenty of rising height available in the first conduit between the branching off and the filter element, so that the water level does not reach the filter element.

In a particularly preferred embodiment of the fuel filter, the second conduit branches off from the first conduit in a substantially perpendicular manner. This prevents the water-fuel mixture that has been separated at the sedimentation slit from flowing directly from the first conduit into the second conduit—instead of continuing on into the collection chamber.

The second conduit may have a defined cross-section due to a throttle. The throttle makes it possible to control the recirculation rate from the branching off into the tank of the motor vehicle. The throttle may be constructed in the form of a bore.

An embodiment of the throttle that is particularly simple in terms of construction and a consequently economical producibility of the fuel filter are achieved by constructing the throttle in the form of a press-fit throttle and press-fitting the throttle into the second conduit.

An optimal reflux rate of the water-fuel mixture into the tank is achieved when the throttle has an effective throughflow cross-section that corresponds to a circular cross-sectional area having a diameter of 0.2 to 0.6 mm, in particular 0.3 to 0.5 mm. A press-fit throttle makes it possible to easily obtain a smaller and, at the same time, precisely defined throughflow cross-section.

BRIEF DESCRIPTION OF THE DRAWINGS

Further features and advantages of the invention shall be made apparent from the following detailed description of an embodiment of the invention, with reference to the drawings illustrating details essential the invention, as well as from the claims.

The features depicted in the drawings are represented such that the special features according to the invention can be made clearly visible. The various features may be implemented each individually, or collectively in any combination in variants of the invention.

DETAILED DESCRIPTION OF PREFERRED EMBODIMENTS

Figure 1:
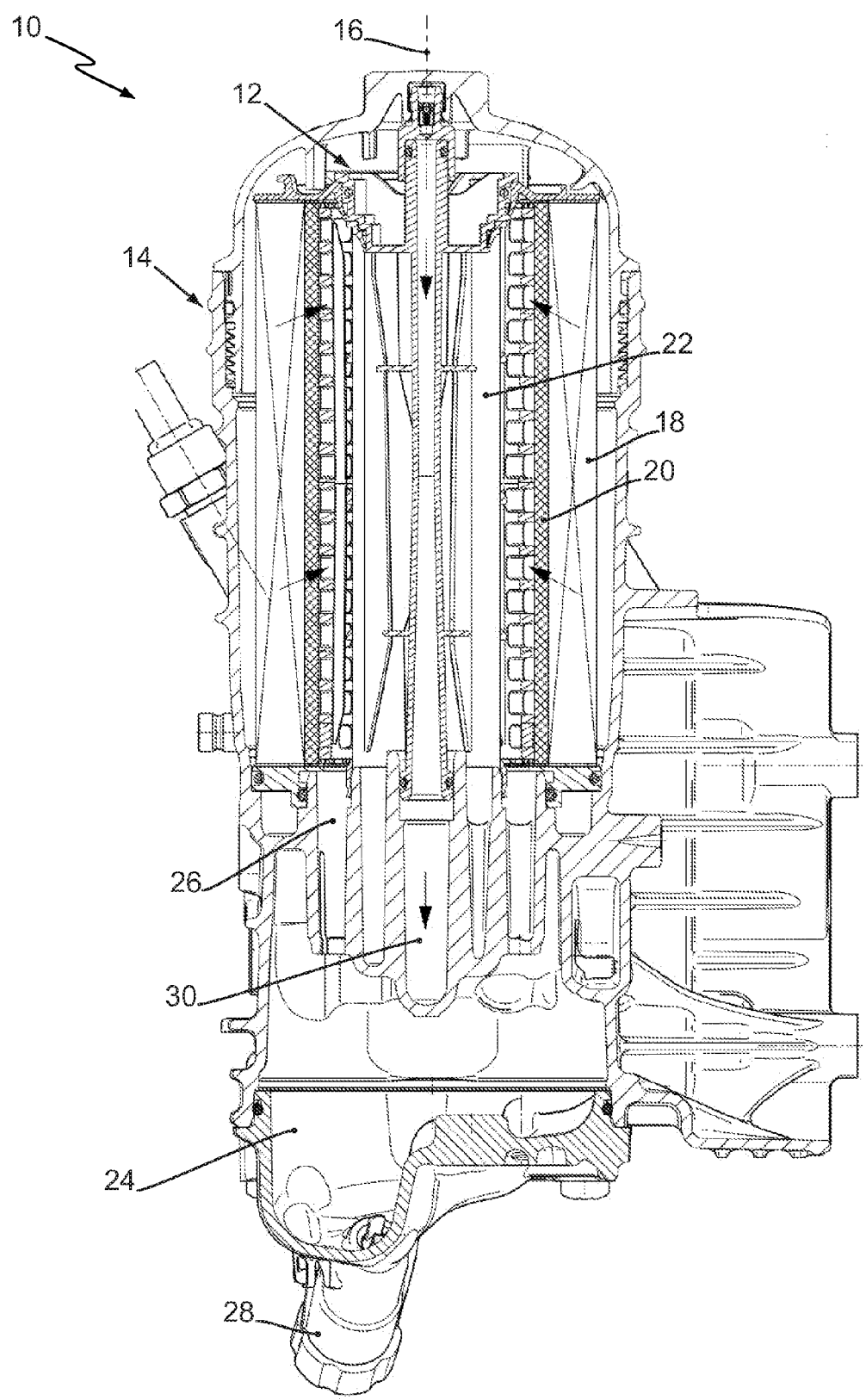
FIG. 1 illustrates a first sectional view of a fuel filter according to the invention.

FIG. 1 illustrates a cross-section of a fuel filter 10 according to the invention. The fuel filter 10 is configured in order to filter fuel, e.g., in order to filter diesel fuel. The fuel filter 10 is then furnished downstream of the pressure-side arrangement, i.e., a fuel pump (not shown). Fuel for an internal combustion engine of a motor vehicle (not shown) is cleaned by the fuel filter 10.

The cleaning of the fuel comprises filtering out both particles and water from the fuel. The fuel filter 10 comprises a filter element 12 for this purpose. The filter element 12 is arranged in a housing 14 of the fuel filter 10.

The filter element 12 is constructed in axial symmetry to the longitudinal axis of the fuel filter 10 (referred to as a fuel filter longitudinal axis 16 hereinafter). The filter element 12 comprises a particulate filter medium 18 for filtering out particles of dirt in the fuel. The separation of water from the fuel takes place in a plurality of stages. In a first stage, small water droplets distributed in the fuel are coalesced in a coalescer medium 20. In a second stage, the coalesced water (along with a smaller proportion of fuel) is separated out at a sedimentation slit 22. Stated more precisely, what is separated out in the filter element 12 is not pure water, but rather water comprising a small proportion of fuel. This mixture is referred to as a water-fuel mixture hereinafter.

The housing 14 comprises a collection chamber 24 (or water collection chamber), arranged in operation below the filter element 12, for the separated water-fuel mixture. The water-fuel mixture that is separated at the filter element 12 flows via a first conduit 26 into the collection chamber 24. The first conduit 26 is formed in the housing 14. The first conduit 26 is in the shape of a closed loop. It is constructed in radial symmetry to the fuel filter longitudinal direction 16. The first conduit 26 is aligned in the axial direction to the sedimentation slit 22. The first conduit 26 then runs in the direction of the fuel filter longitudinal direction 16.

The water-fuel mixture accumulates in the collection chamber 24. This results in further separation of water and fuel: the fuel has a lower density in comparison to the water, and therefore floats atop the water. The water, located beneath the fuel, can then be drained via an outlet 28 and discarded.

The water that is discharged via the outlet 28 may still contain some fuel, and therefore the water should, for example, only be drained and discarded in a workshop. In the collection chamber 24, there are water level sensors (not shown) that trigger an alarm when a predetermined fill level of the water in the collection chamber 24 is reached. In particular, the driver of the motor vehicle may be notified, via the lighting of a light, that the collection chamber 24 needs to be emptied in a workshop.

If the alarm is ignored by the driver and the driver continues to operate the internal combustion engine, i.e., continues driving, then there is the risk that water could leave the collection chamber 24 and reach a supply line 30 of the fuel filter 10 to the internal combustion engine, and damage the internal combustion engine.

A means for discharging or recirculating a part of the water-fuel mixture from the first conduit 26 into the tank of the motor vehicle is therefore provided according to the invention.

Figure 2:
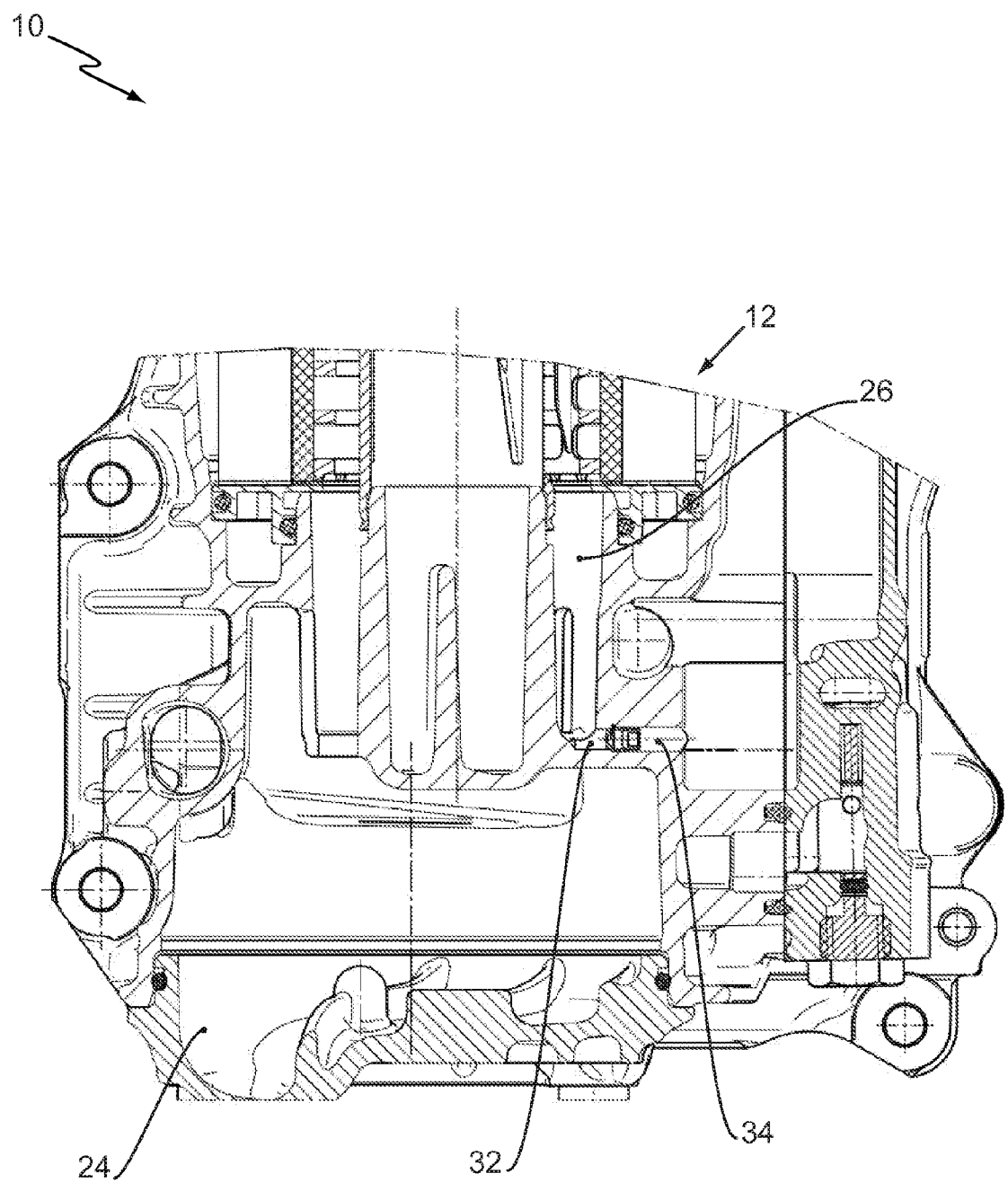
FIG. 2 illustrates a detail of a second sectional view of the fuel filter from FIG. 1.

FIG. 2 illustrates another sectional view of the fuel filter 10 in an enlarged view that elaborates on this recirculation.

As shown in FIG. 2, a second conduit 32 branches off from the first conduit 26. The second conduit 32 is then arranged above the collection chamber 24 in operation. In other words, the branching off of the second conduit 32 does not take place in the collection chamber 24. The second conduit 32 branches off from the first conduit 26 in a lower region of the first conduit 26. A "lower region of the first conduit 26" means here a region that is (far) removed from the filter element 12, near the collection chamber 24. The second conduits 32 is connected directly to the first conduit 26 at one end and connected indirectly to a tank (not shown) of the motor vehicle at another end. Thus, if the water-fuel mixture in the collection chamber 24 breaches the height of the collection chamber 24, the upper part of the water-fuel mixture will then flow out into the tank via the second conduit 32. The upper part of the water-fuel mixture entails practically exclusively fuel, and therefore the tank is subjected to only a small amount of water.

The second conduit 32 branches off perpendicularly from the first conduit 26. This causes the water-fuel mixture that is separated at the filter element 12 to flow primarily through the first conduit 26 into the collection chamber 24 and not into the second conduit 32.

The outflow through the second conduit 32 is defined by a throttle 34. The throttle 34 is constructed in the form of a press-fit throttle. The throttle 34 then has an effective throughflow cross-section of 0.13 mm$^2$. This corresponds to a circular cross-sectional area having a diameter of 0.4 mm.

In summary, the invention relates to a fuel filter having a filter element for separating water from the fuel. The water can be sent to a collection chamber of the fuel filter via a first conduit that extends from the filter element to the collection chamber. In the first conduit, a branching off of a second conduit is provided, which enables fluid discharge from the first conduit. In order to regulate the amount of outflow, preferably a throttle and in particular a press-fit throttle is provided in the second conduit. The second conduit preferably branches off from the first conduit substantially at a 90 degree angle to the first conduit, so that fluid that is flowing in the first conduit primarily flows past the second conduit and reaches the collection chamber.

What is claimed is:

1. A fuel filter for an internal combustion engine of a motor vehicle, the fuel filter comprising:
    a fuel filter housing having a collection chamber;
    a filter element arranged in the fuel filter housing, the filter element configured to separate water from a water-fuel mixture and discharging the water into the collection chamber of the fuel filter via a first conduit;
    wherein the fuel filter has a second conduit recirculating at least a part of the water-fuel mixture into a fuel tank of the motor vehicle; and
    wherein the second conduit branches off from the first conduit.

2. The fuel filter according to claim 1, wherein
the first conduit is constructed in the form of a closed circular conduit running in a fuel filter longitudinal direction.

3. The fuel filter according to claim 2, wherein
the filter element is constructed in axial symmetry to the fuel filter longitudinal direction;
wherein the filter element comprises a sedimentation slit that is fluidly connected to the first conduit.

4. The fuel filter according to claim 3, wherein
the first conduit is aligned with the sedimentation slit.

5. The fuel filter according to claim 3, wherein
the filter element comprises a coalescer medium spaced apart radially from the sedimentation slit.

6. The fuel filter according to claim 1, wherein
the second conduit branches off from the first conduit in a lower region of the first conduit facing away from the filter element.

7. The fuel filter according to claim 6, wherein
the second conduit branches off from the first conduit substantially perpendicularly.

8. The fuel filter according to claim 1, wherein
the second conduit comprises a throttle having a reduced effective throughflow cross section sized to limit flow through the second conduit such that fluid flow preferentially flows through the first conduit into the collection chamber rather than the second conduit.

9. The fuel filter according to claim 8, wherein
the throttle is constructed in the form of a press-fit throttle and is press-fitted into the second conduit.

10. The fuel filter according to claim 8, wherein
the effective throughflow cross-section of the throttle corresponds to a circular cross-sectional area having a diameter of 0.2 to 0.6 mm.

11. The fuel filter according to claim 10, wherein
the effective throughflow cross-section of the throttle corresponds to a circular cross-sectional area having a diameter of 0.3 to 0.5 mm.

* * * * *